US012250015B2

(12) United States Patent
Ramkaj et al.

(10) Patent No.: US 12,250,015 B2
(45) Date of Patent: Mar. 11, 2025

(54) FRONT-END FOR RECEIVERS WITH RF SAMPLING ADCS

(71) Applicant: Analog Devices International Unlimited Company, Limerick (IE)

(72) Inventors: Athanasios Ramkaj, Leuven (BE); Gabriele Manganaro, Winchester, MA (US); Filip Tavernier, Oud-Heverlee (BE); Siddharth Devarajan, Arlington, MA (US)

(73) Assignee: Analog Devices International Unlimited Company, Limerick (IE)

( * ) Notice: Subject to any disclaimer, the term of this patent is extended or adjusted under 35 U.S.C. 154(b) by 255 days.

(21) Appl. No.: 17/903,970

(22) Filed: Sep. 6, 2022

(65) Prior Publication Data
US 2023/0069891 A1 Mar. 9, 2023

Related U.S. Application Data

(60) Provisional application No. 63/241,456, filed on Sep. 7, 2021.

(51) Int. Cl.
*H04B 1/18* (2006.01)
*H04B 1/16* (2006.01)
(52) U.S. Cl.
CPC .............. *H04B 1/18* (2013.01); *H04B 1/1607* (2013.01); *H04B 1/1638* (2013.01)
(58) Field of Classification Search
CPC ......... H03F 2200/451; H03F 2200/294; H03F 3/193; H03F 3/45475; H03F 3/195;
(Continued)

(56) References Cited

U.S. PATENT DOCUMENTS 10,141,971 B1 * 11/2018 Elkholy ............... H04B 7/2615
11,139,847 B2 * 10/2021 Stuenkel .............. H03L 7/0812
(Continued)

OTHER PUBLICATIONS

Ali et al., "A 12b 18GS/s RF Sampling ADC with an Integrated Wideband Track-and-Hold Amplifier and Background Calibration," IEEE Int. Solid-State Circuits Conf. (ISSCC) Dig. Tech. Papers, pp. 250-251, Feb. 2020.
(Continued)

*Primary Examiner* — Golam Sorowar
(74) *Attorney, Agent, or Firm* — Knobbe, Martens, Olson & Bear, LLP (57) ABSTRACT

Front-end circuitry is difficult to design for high sample rate, wide bandwidth receivers with high performance requirements on noise and linearity. One exemplary front-end circuitry is integrated on-chip with the RF ADC in a receiver, and the circuitry implements ESD protection, attenuation, and gain. The circuitry includes a multi-tap filter with LC circuits, and the filter implements a highly linear filter. Advantageously, the capacitors in the LC circuits are also used for ESD protection. Additionally, tunable attenuator cells are implemented across the multi-tap filter to provide a wide range of variable attenuation. The circuitry can further include a fixed or variable gain stage at the output. The resulting circuitry offers variable gain and attenuation while meeting bandwidth, noise, and linearity requirements.

21 Claims, 9 Drawing Sheets

(58) Field of Classification Search
CPC ............ H03F 1/223; H03F 1/565; H03F 3/19; H03F 2200/222; H03F 3/24; H03F 3/45183; H03F 3/211; H03F 3/245; H03F 3/45179; H03F 3/68; H03F 1/0205; H03F 1/26; H03F 1/3205; H03F 2200/129; H03F 2200/372; H04B 1/16; H04B 1/18; H04B 1/40; H04B 1/0007; H04B 1/3822; H04B 1/1036; H04B 1/0475; H04B 2001/0408; H04B 2001/1063; H04B 2001/0425; H04B 1/1638; H04B 1/525; H04B 14/06; H04B 1/48; H04B 17/21; H04B 1/0057; H04B 1/0483; H04B 1/52; H04B 1/005

See application file for complete search history.

(56) References Cited

U.S. PATENT DOCUMENTS

| | | | | |
|---|---|---|---|---|
| 2010/0027301 | A1* | 2/2010 | Hoyerby | H02M 3/1563 |
| | | | | 363/39 |
| 2011/0215981 | A1* | 9/2011 | Kim | H04B 1/48 |
| | | | | 343/852 |
| 2013/0207872 | A1* | 8/2013 | Bakalski | H03H 7/40 |
| | | | | 333/32 |
| 2014/0120849 | A1* | 5/2014 | Peltonen | H04B 17/103 |
| | | | | 455/77 |
| 2015/0303889 | A1* | 10/2015 | Muterspaugh | H04B 1/16 |
| | | | | 333/132 |
| 2018/0062622 | A1* | 3/2018 | Yan | H03H 7/25 |

OTHER PUBLICATIONS

Bulzacchelli et al., "A 28-GB/s 4-Tap FFE/15-Tap DFE Serial Link Transceiver in 32-nm SOI CMOS Technology," IEEE J. Solid-State Circuits, vol. 47, No. 12, pp. 3232-3248, Dec. 2012.

Chen et al., "A 50-64 GB/s Serializing Transmitter with a 4-Tap, LC-Ladder-Filter-Based FFE in 65 nm CMOS Technology," IEEE J. Solid-State Circuits, vol. 50, No. 8, pp. 1903-1916, Aug. 2015.

Im et al., "A 112Gb/s PAM-4 Long-Reach Wireline Transceiver Using a 36-Way Time-Interleaved SAR-ADC and Inverter-Based RX Analog Front-End in 7nm FinFET," IEEE Int. Solid-State Circuits Conf. (ISSCC) Dig. Tech. Papers, pp. 116-117, Feb. 2020.

Ito et al., "Analysis and Design of Distributed ESD Protection Circuits for High-Speed Mixed-Signal and RF ICs," IEEE Trans. on Electron Devices, vol. 49, No. 8, pp. 1444-1454, Aug. 2002.

Kim et al., "A 112 GB/s PAM-4 56 GB/s NRZ Reconfigurable Transmitter with Three-Tap FFE in 10-nm FinFET," IEEE J. Solid-State Circuits, vol. 54, No. 1, pp. 29-42, Jan. 2019.

Razavi et al., "The Bridged T-Coil: A Circuit for All Seasons," IEEE Solid-State Circuits Magazine, pp. 9-13, Fall 2015.

Song et al., "Design and Analysis of a Low Loss, Wideband Digital Step Attenuator with Minimized Amplitude and Phase Variations," IEEE J. Solid-State Circuits, vol. 53, No. 8, pp. 2202-2213, Aug. 2018.

\* cited by examiner

FRONT-END FOR RECEIVERS WITH RF SAMPLING ADCS

PRIORITY DATA

This patent application claims priority to and receives benefit from U.S. Provisional Application Ser. No. 63/241,456 (hereinafter "the '456 application"), having the same title, and filed on Sep. 7, 2021. The '456 application is incorporated herein in its entirety.

TECHNICAL FIELD OF THE DISCLOSURE

The present disclosure relates generally to front-end circuitry, more particularly but not limited to, front-end circuitry for receivers with radio-frequency (RF) sampling analog-to-digital converters (ADCs).

BACKGROUND

Demand for higher sample rate and wider bandwidth in both wireline and wireless communications applications have spurred the need for transceivers with bandwidths well above several tens of giga-Hertz (GHz). Transceiver circuit designs can be particularly challenging for an RF sampling ADC-based receiver, where such input bandwidths need to be guaranteed while preserving very high linearity levels across the entire band of interest.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Front-end circuitry is difficult to design for high sample rate, wide bandwidth receivers with high performance requirements on noise and linearity. One exemplary front-end circuitry is integrated on-chip with the RF ADC in a receiver, and the circuitry implements ESD protection, attenuation, and gain. The circuitry includes a multi-tap filter with inductor-capacitor (LC) circuits, and the filter implements a highly linear filter. Advantageously, the capacitors in the LC circuits are also used for ESD protection. Additionally, tunable attenuator cells are implemented across the multi-tap filter to provide a wide range of variable attenuation. The circuitry can further include a fixed or variable gain stage at the output. The resulting circuitry offers variable gain and attenuation while meeting bandwidth, noise, and linearity requirements.

Shortcomings of Other Solutions

Some solutions have fallen short in collectively meeting high performance specifications, especially at the ADC-based receiver input. Some solutions use inductive Tin-coils have been used at the input of wireline receivers to tune out the total parasitic capacitance and improve the bandwidth. Some solutions also include variable gain/attenuation with active circuits, which ultimately limit the bandwidth and are also limited to linearity and noise levels far from what is required by a receiver with an RF sampling ADC (also referred herein as an RF ADC-based receiver or an RF sampling ADC-based receiver). Some solutions do not offer gain or attenuation control readily or seamlessly to provide the expected full-scale input to the ADC and meet the high performance specifications. The following passages describe some exemplary solutions and the limitations thereof.

There are multiple factors that contribute to limiting the input bandwidth of an RF ADC-based receiver. The factors can include a combination of on-chip as well as off-chip contributions. Depending on the specific receiver design, some may dominate the signal transfer function over others. On-chip contributions can include, but are not limited to: 1) the parasitic ESD capacitance, 2) the parasitic capacitance of the termination network, 3) the input capacitance of the ADC driver/buffer, and 4) the interconnect parasitic capacitance. Off-chip contributions can include but are not limited to: 1) the parasitic capacitance from the bumping and packaging, and 2) the losses from the board/laminate routing.

Figure 1:
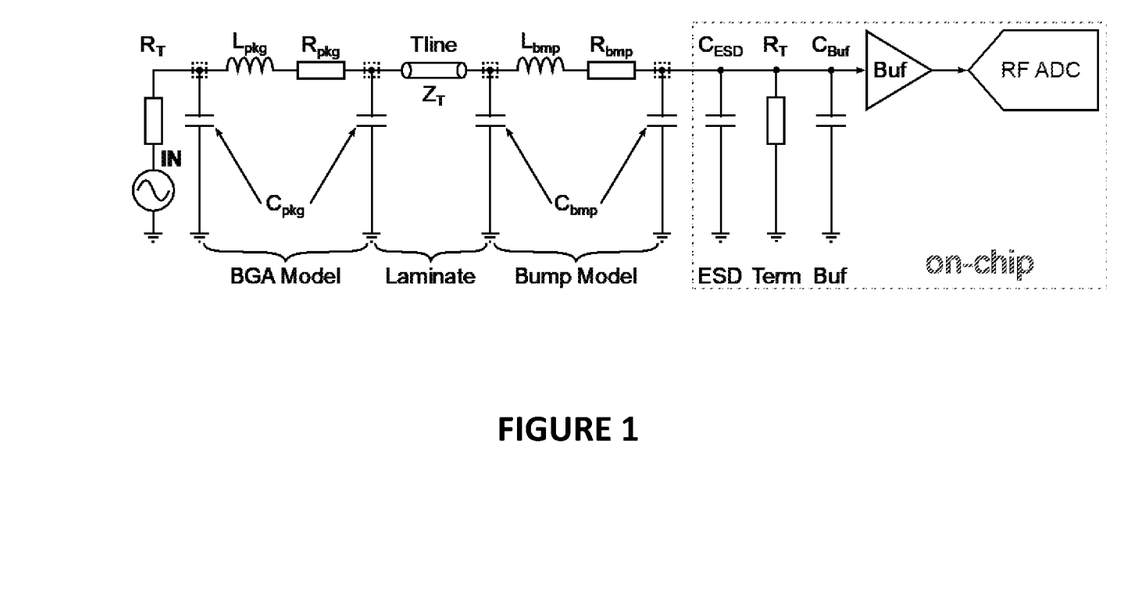
FIG. 1 illustrates a model for a receiver with an RF ADC, according to some embodiments of the disclosure.

FIG. 1 illustrates a model for a receiver with an RF ADC, according to some embodiments of the disclosure. Among the above contributions, the parasitic ESD capacitance $C_{ESD}$ for a sufficient protection, with values ranging between 200 fF-400 fF, can be a major contribution to degrading the input bandwidth. The ADC input buffer capacitance $C_{Buf}$ (together with interconnect) with values in the range of 50 fF-100 fF, can also a considerable contribution depending on the ADC input load and the sampling period, which define the buffer's current.

Figure 2:
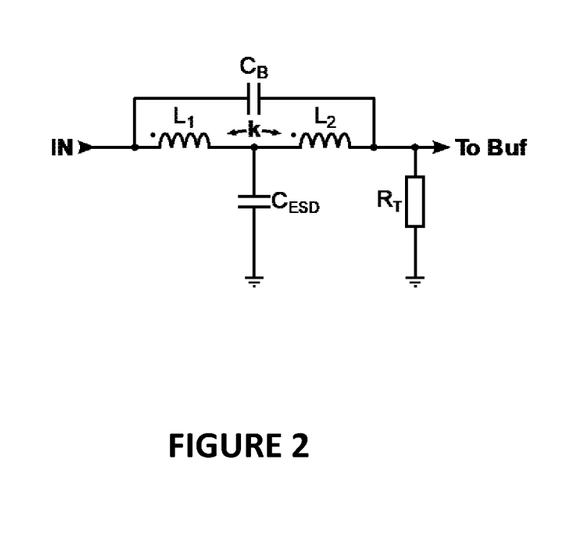
FIG. 2 illustrates an input network model having electrostatic discharge (ESD) capacitance and T-coil, according to some embodiments of the disclosure.

Similarly, the output of a transmitter can have the ESD protection at the output pad. FIG. 2 illustrates an input network model having electrostatic discharge (ESD) capacitance $C_{ESD}$ and a T-coil structure, according to some embodiments of the disclosure. Some solutions tune out $C_{ESD}$ and extend the bandwidth by employing T/Π-coils both at the transmitter as well as at the receiver. Two mutually coupled inductors with the proper coupling polarity K can tune out a certain capacitance connected at their middle tap. The structure can be implemented for more than one tap to tune out $C_{Buf}$ and can be superior to simply placing inductors, due to the coupling K. However, a sufficiently high coupling is required between the inductors (K>0.5), which is not always easy or possible when such a structure is integrated on-chip. Furthermore, for $C_{ESD}$ in practical designs as mentioned above, the required inductor values can be quite large (>150-200 pH), which is not area-efficient and can result in unwanted coupling with other parts on the chip.

Figure 3:
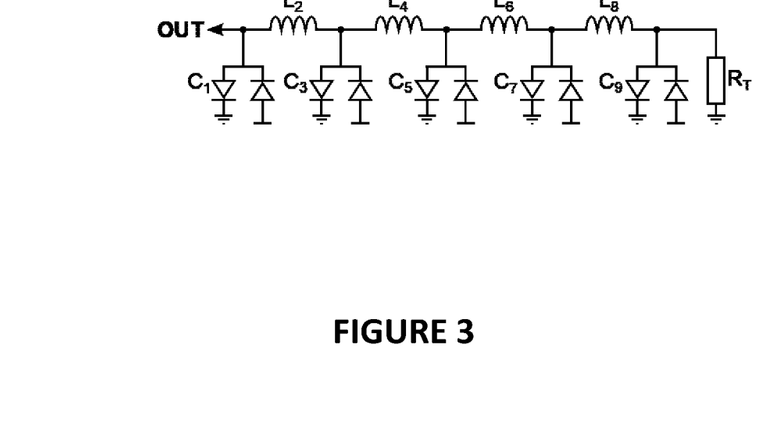
FIG. 3 illustrates splitting ESD capacitance at a transmitter output in a filter arrangement, according to some embodiments of the disclosure.

An alternative solution is to split the $C_{ESD}$ into multiple segments separated by inductors, forming an LC delay line emulating a transmission line. However, due to the nature of the lumped LC components, many segments are needed to correctly emulate a transmission line, which can significantly increase the area. A more attractive approach is to distribute the $C_{ESD}$ by designing the inductors based on filter theory. FIG. 3 illustrates splitting ESD capacitance $C_{ESD}$ at a transmitter output in a filter arrangement, according to some embodiments of the disclosure. Depending on the capacitance to be tuned out and the bandwidth requirement, the components' values can be determined for the filter arrangement. However, splitting the ESD capacitance $C_{ESD}$ into too many segments can severely degrade the protection and even damage the protection circuit itself (e.g. if all the current goes to one segment prior to reaching the other segments). The protection requirement can be somewhat more relaxed at the output of the transmitter, which is typically the drain of a transistor, already having a junction diode. However, at the input of the receiver, the ESD protection requirements are much stricter, therefore a solution like the one in FIG. 3 would impose a serious reliability issue. Further, if a variable gain/attenuation is required in the receiver, this is typically done by controlling the gain of active circuits (e.g., transconductance (gm) or resistance at the output (Rout)). Such mechanisms for controlling gain would eventually reduce the bandwidth benefits and/or fail to meet the required linearity/noise specifications, while tremendously increasing the power of the entire receiver signal chain. In other words, a solution like the one in FIG. 3 is not applicable or viable for a receiver front-end circuit.

Designers have been challenged by the limitations described above to design a front-end that can meet bandwidth, linearity, noise, reliability, and power specifications of RF sampling ADC-based receivers. Many solutions defer to designing a strong enough unity gain buffer to drive the ADC (shown as "Buf" in FIG. 1), instead of implementing other solutions.

Integrated Front-End Circuitry for RF Sampling ADC-Based-Receiver

Figure 4:
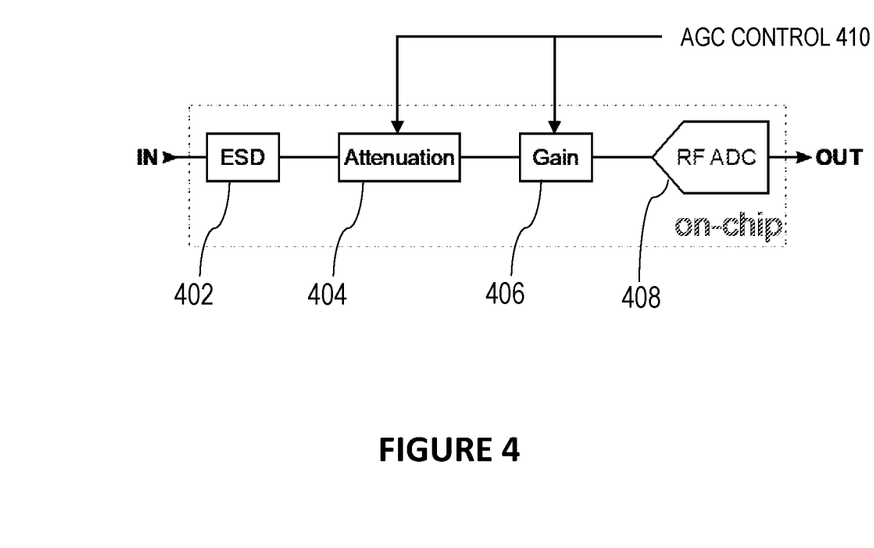
FIG. 4 illustrates an exemplary integrated front-end for a receiver and an RF ADC of the receiver, according to some embodiments of the disclosure.

Some of the concerns mentioned above can be addressed with a different circuit design for the front-end of an RF ADC-based receiver. Additionally, the design can provide additional gain and attenuation functionality at the input of an RF sampling ADC-based receiver. FIG. 4 illustrates an exemplary integrated front-end for a receiver and an RF ADC 408 of the receiver, according to some embodiments of the disclosure. The integrated front-end at the input of an RF ADC 408 can include ESD functionality 402, attenuation functionality 404, and gain functionality 406. The blocks are shown in the FIGURE to represent functionality, and do not necessarily represent actual and discrete circuit blocks arranged in the manner as shown. The front-end can be on-chip with the RF ADC 408 by design. The attenuation can be tunable. Attenuation can be tuned based on an automatic gain control (AGC) signal 410. The gain can be variable. Gain can be adjusted based on an AGC signal 410. The AGC signal 410 can be generated by sensing one or more of: the input of the receiver (e.g., the received signal), a signal within the receiver, and the output of the RF ADC (e.g., an output signal of the RF ADC 410). The AGC signal can be provided as feedback to adjust attenuation and/or gain of the front-end circuitry.

Figure 5:
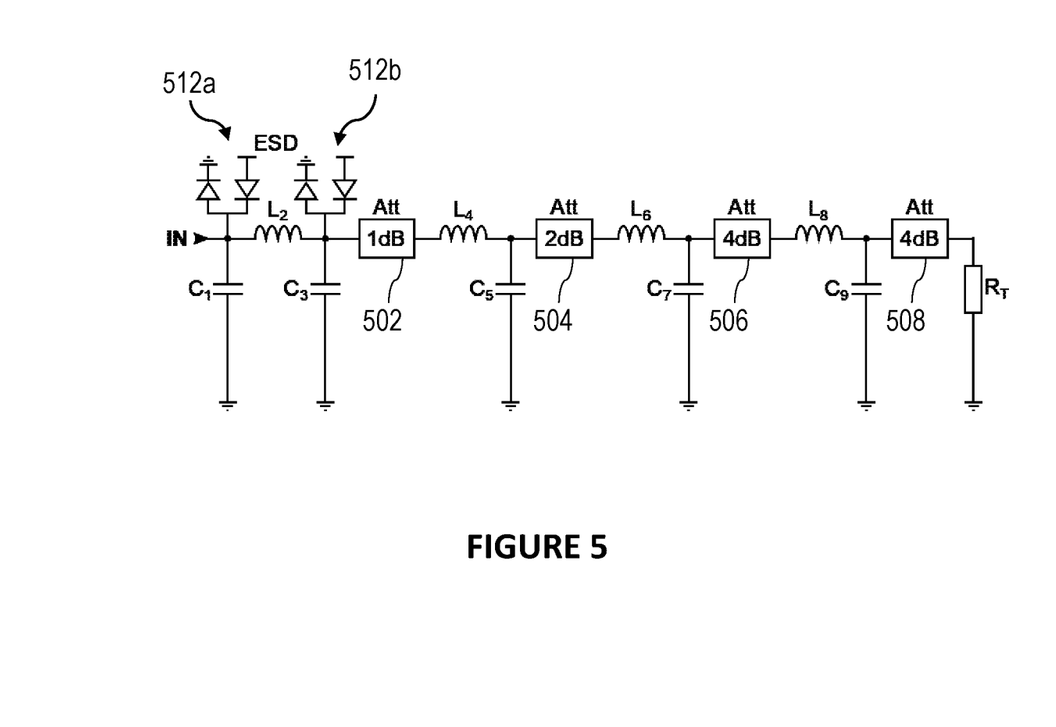
FIG. 5 illustrates blocks and circuitry within an exemplary front-end, according to some embodiments of the disclosure.

FIG. 5 illustrates blocks and circuitry within an exemplary front-end, according to some embodiments of the disclosure. The exemplary front-end is shown as a single-ended circuit for simplicity. It is envisioned that the front-end can be implemented differentially. The front-end can meet wide bandwidth, noise, and linearity requirements, while provide gain and attenuation functionalities. The front-end includes a multi-tap filter, where $C_{ESD}$ is split appropriately and several attenuator cells (shown as "Att") are distributed within the multi-tap filter. In the example shown, $C_{ESD}$ is split into capacitances $C_1$, $C_3$, $C_5$, $C_7$, and $C_9$ (shunt capacitors). and the front-end includes attenuator cells 502, 504, 506, and 508. The front-end can further include a gain stage at the output after the multi-tap filter, but the gain stage is not shown in FIG. 5.

The structure as illustrated in the FIGURE can implement a desirable, linear filter in the front-end by selecting appropriate values for the capacitances and inductances. For instance, the structure having a multi-tap filter can implement a $9^{th}$ order symmetrical Chebyshev filter. Other types or orders of filters can be implemented and are e envisioned by the disclosure. To implement the $9^{th}$ order symmetrical Chebyshev filter, the structure as seen in FIG. 5 can include capacitances $C_1=C_9$, $C_3=C_7$, and $C_5$ and inductances $L_2=L_8$, $L_4=L_6$.

In some embodiments, the structure with the multi-tap filter starts with a shunt capacitor first, to minimize the number of inductors. In the example shown, four inductors are included. If the filter starts with a series inductor first, then a total of five inductors are included in such multi-tap filter.

In some embodiments, a plurality of attenuator cells can be distributed across the taps of the multi-tap filter. For the example shown in FIG. 5, four attenuator cells 502, 504, 506, and 508 are distributed across the taps (i.e., with each LC structure of the multi-tap filter). One or more ones of the attenuator cells 502, 504, 506, and 508 can have programmable attenuation. One or more ones of the attenuator cells 502, 504, 506, and 508 can be switched on or off (e.g., implementing zero attenuation) to provide the desired/required swing at the termination point or at the input of the RF ADC (not shown). The respective attenuator cells 502, 504, 506, and 508 can have values 1 dB, 2 dB, 4 dB, and 4 dB. Because the attenuator cells 502, 504, 506, and 508 are tunable, the cells can provide a total range of 0-11 dB attenuation with a tuning step of 1 dB.

The ESD protection 512 is also shown in FIG. 5. ESD protection 512 (having the diodes) is split in two segments (only) to improve reliability, and is integrated with the multi-tap filter. As shown, one segment 512a is upstream of $L_2$, and the other segment 512b is downstream of $L_2$. The two segments 512a and 512b are designed in such a way that the current path to the first segment roughly matches the current path to the second segment (i.e., the first segment involves more stacking than the second one), including the resistance of $L_2$. Current matching can be implemented by involving more device stacking in the first segment compared to the second segment to increase its resistance by roughly the same amount as the resistance of $L_2$. In this way, the current splits more evenly across the ESD devices, minimizing the risk of damaging the protection circuit and eventually the core circuit.

The circuit structure as illustrated by FIG. 5 can be extended or generalized to any suitable order or type for the filter. Depending on the bandwidth requirements and tolerances, more or less taps can be employed. More taps result in a more wideband behavior but can increase the area of the circuitry. The LC values can result from an achievable bandwidth-passband ripple trade-off (more bandwidth can be achieved if more ripple or worse S11 is tolerated in the passband). Also, the number of attenuator cells within it and their values can vary depending on the application.

There is an unexpected synergistic effect when the front-end combines ESD protection and attenuator cells within the multi-tap filter structure in the manner illustrated in FIG. 5. The bandwidth benefits result from the filter itself already implementing the capacitors shown in in FIG. 5. Therefore, if designed properly, the capacitance of the ESD as well as the attenuators can be substantially absorbed by reducing the (existing) capacitor values by the same amount. To attain maximum bandwidth while being able to absorb as much capacitance as possible, the termination resistor $R_T$ can be designed as 25Ω (50Ω differential), which is reduced from other solutions implementing 50Ω (100Ω differential) termination. The reduction in termination resistance can leads to a 2× reduction in the inductor values for an equivalent 2× increase in the capacitor values. Hence, the filter is able to absorb the full capacitance of (industrially compliant) ESD protection by splitting the ESD protection circuit only in two segments, therefore achieving maximum bandwidth and reliability. The area benefits from doing that are also substantial, since the extra capacitance (which can be constructed by Only-Metal Metal-on-Metal (MOM) structures) can be achieved by stacking more MOM metals vertically, while the inductors are becoming physically smaller.

Designing and Implementing the Attenuator Cells to Achieve High Linearity

Attenuator cells are implemented in such a way to achieve (maximum attainable) linearity, without degrading the bandwidth. The attenuators from the input to the output of the front-end are arranged to have the smallest attenuation to the largest attenuation (or non-decreasing attenuation). One arrangement is illustrated in FIG. 5 The arrangement of attenuators in this manner yields the biggest linearity benefits for a fixed swing at the termination point, when the attenuator circuits are considered.

Figure 6:
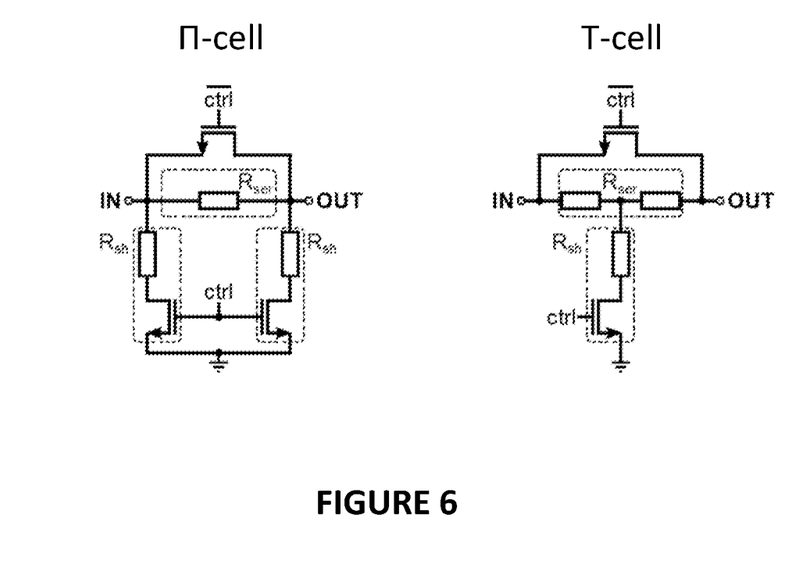
FIG. 6 illustrates switched attenuator cells, according to some embodiments of the disclosure.

FIG. 6 illustrates switched attenuator cells, according to some embodiments of the disclosure. Left side is the Π-cell, and right side is the T-cell. The cells include a series resistor $R_{ser}$ and a shunt resistor $R_{sh}$ sized for a given impedance and attenuation, while a bypass switch (controlled by $\overline{ctrl}$) serves to short the input-output nodes (input and output nodes) in the 0 dB attenuation state. Typically, both $R_{ser}$ and $R_{sh}$ include physical resistors.

The Π-cell offers a wider bandwidth due to the single $R_{ser}$ device, while the T-cekk exhibits greater linearity in virtue of its double-sized $R_{ser}$ devices, thus half the non-linear on-resistance. For best performance and optimum filter utilization, attenuator 502 (1 dB segment) can be implemented using the Π-cell, and attenuators 504, 506, and 508 can be implemented using the T-cell.

Figure 7:
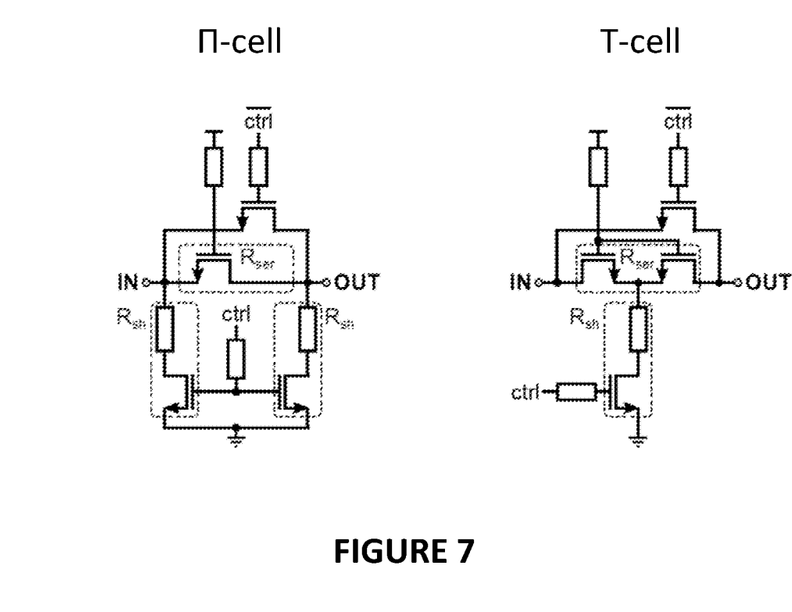
FIG. 7 illustrates further switched attenuator cells using transistor(s) as a series resistance, according to some embodiments of the disclosure.

In a fine CMOS technology, such as 16 nm FinFET, a linear enough resistor option is Poly-Resistors. The required $R_{ser}$ for the employed attenuation values are <10Ω (for the smallest attenuation, it is only 2.8Ω), making it impossible to use Poly-Resistors in the series path since Poly-Resistors are too large. To address this problem, $R_{ser}$ can be implemented using transistor(s) with bootstrapped gate(s) (through large gate resistors) to improve their linearity. FIG. 7 illustrates further switched attenuator cells using transistor(s) as a series resistance, according to some embodiments of the disclosure. Left side is the Π-cell, and right side is the T-cell. The transistor(s) implementing $R_{ser}$ are biased to be constantly on to assist the bypass switches in the 0 dB state by providing a better input-output short (smaller resistance due to parallel connection) and reaching closer to the ideal 0 dB value.

Bootstrapping of transistors in the attenuator cells can improve linearity by stabilizing the gate to source voltage of a transistor and reduce stress on the transistor if one terminal of the transistor sees a huge signal swing. The gate of the transistor implementing $R_{ser}$ can be bootstrapped to the input. The gate of the transistor in the bypass switch can be bootstrapped to the input. The gate of the transistor in the shunt path can be bootstrapped to the drain, since the signal at the drain would have significant signal swing.

A suitable protection circuit may be added to the transistor implementing $R_{ser}$ because the transistor may be over-stressed if the gate is at ground (provided as an "off" voltage for the transistor), and the input is a relatively high signal. Appropriate protection circuit can prevent the overstress condition by, e.g., making the gate's "off" control signal follow the input. The transistor implementing $R_{ser}$ at the first attenuator may see the largest input swing, and thus may have the biggest need for a protection circuit. The transistor(s) implementing $R_{ser}$ may have a lesser need such a protection circuit.

Putting the smallest attenuation where the signal swing is the highest (closest to the pad) yields the best linearity, since the arrangement would give the smallest voltage drop across a non-linear resistor. This arrangement would also yield the same linearity benefit even if $R_{ser}$ is implemented with physical resistor, since they are not entirely linear either. Therefore, it is beneficial to arrange the attenuations in a non-decreasing or ascending manner.

A trade-off also exists between the two attenuator types (Π-cell and T-cell) in terms of achievable bandwidth and linearity. For the same attenuation, the single series switch (one transistor) in the Π-cell has half the size of the two series switches (two transistors in series) in the T-cell, therefore the single series switch has less parasitic capacitance at its nodes. This benefit is particularly profound for the 1 dB attenuation, while the benefit diminishes for higher attenuations. However, the linearity of the T-cell is higher due to half the non-linear switch resistance (double the switch size). To achieve the best of both worlds and get the maximum bandwidth and linearity, some embodiments implement the Π-cell (e.g., left circuit shown in FIG. 7) for the 1 dB attenuation, while implementing the T-cell (e.g., right circuit shown in FIG. 7) for the 2 dB and 4 dB attenuations.

The Gain Stage of the Front-End Circuit

Figure 8:
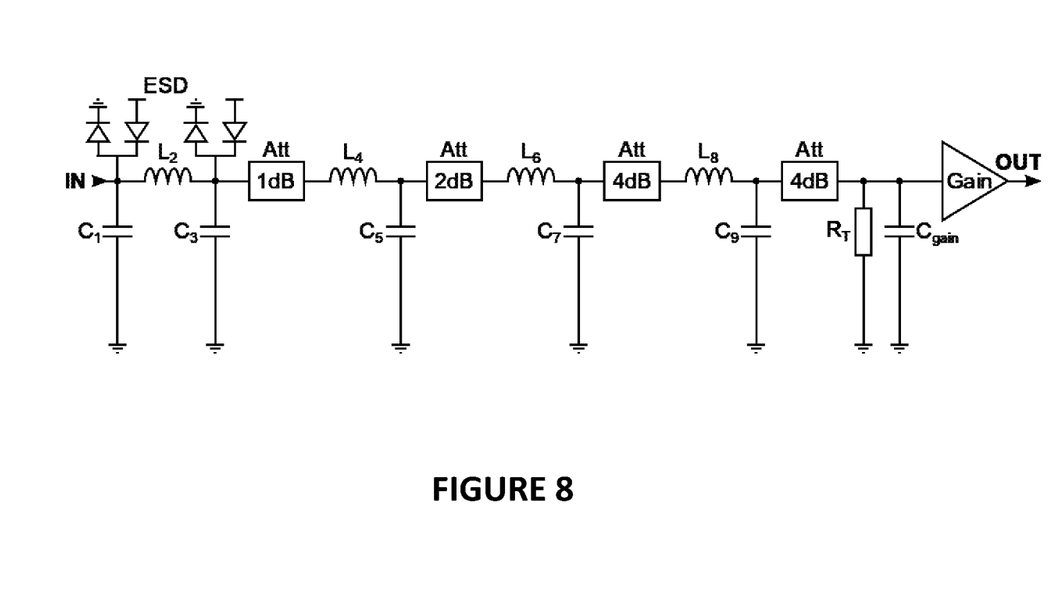
FIG. 8 illustrates blocks and circuitry of an exemplary front-end with the gain stage, according to some embodiments of the disclosure.

To complete the front-end circuit, a (fixed) gain stage can be added at the output of the filter. FIG. 8 illustrates blocks and circuitry of an exemplary front-end with the gain stage, according to some embodiments of the disclosure. The complete front-end is able to provide the necessary ultra-wide bandwidth with variable gain/attenuation. Just like the ESD and the attenuators, the $C_{gain}$ is also absorbed in the filter capacitance, therefore not taking away any of the bandwidth benefits. By varying the matched attenuators across the filter while keeping the gain fixed, the same bandwidth can be preserved for all states. Also, this configuration achieves a far superior linearity than varying the active gain stage, since the attenuator cells (switches) are much more linear than class-A or class-AB gain stages (devices in saturation). The noise of the total chain also remains constant for all states, since the main contributor (gain stage) stays fixed.

Figure 9:
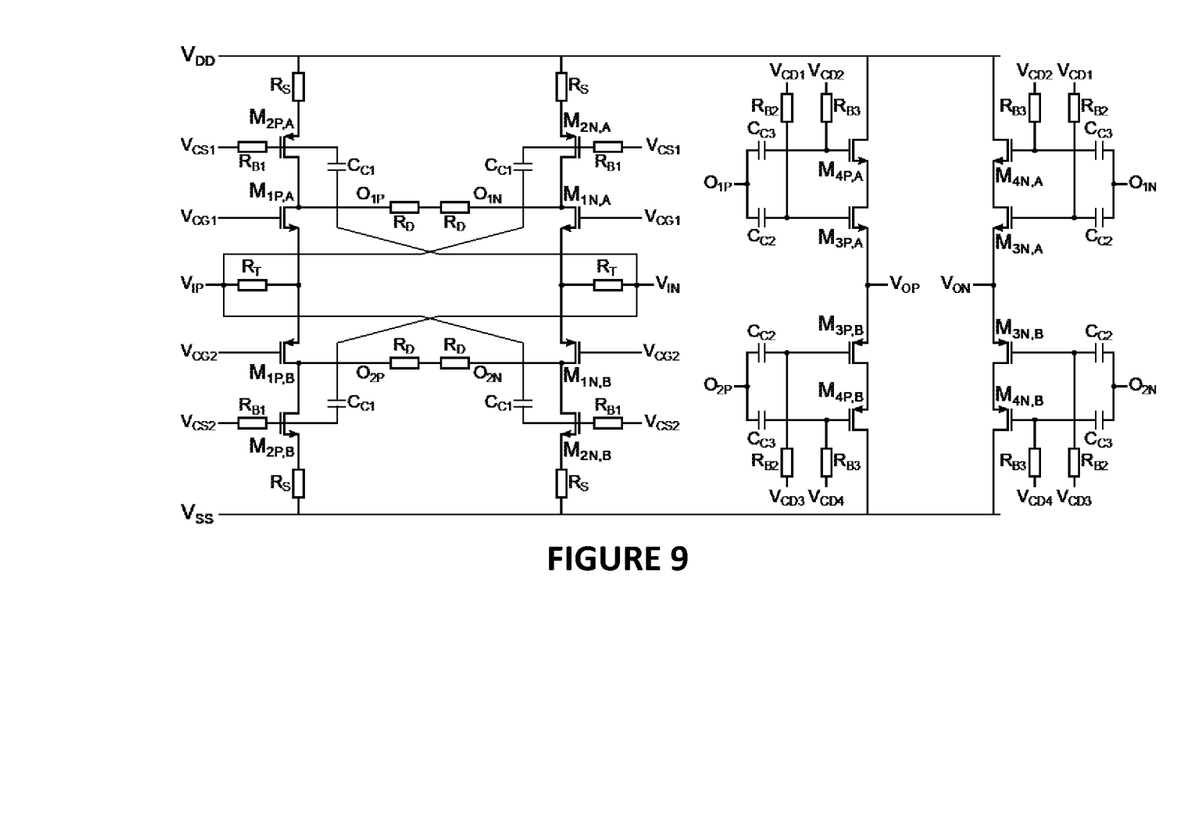
FIG. 9 illustrates an exemplary gain stage, according to some embodiments of the disclosure.

The front-end circuitry can be combined with any suitable type of gain or buffer stage. FIG. 9 illustrates an exemplary gain stage, according to some embodiments of the disclosure. The FIGURE shows a hybrid common gate (CG)-common source (CS) class-AB amplifier with an output common drain (CD) class-AB unity gain buffer. Due to the small input load of this hybrid gain stage, its combination with the rest of the front-end circuitry can be beneficial. In some embodiments, achievable bandwidth of the filter with the ESD and attenuators (input of the gain stage) is >60 GHz with an IM3 in excess of 75 dB across the entire band. Together with the two-stage amplifier-buffer, the receiver signal chain can achieve a bandwidth >30 GHz with an IM3 in excess of 64 dB and NSD<−157 dBFS/Hz when loaded by a 300 fF capacitor. The linearity is dominated by the amplifier-buffer and can be further improved by a polynomial fit linearization scheme. These specifications can remain constant for a gain/attenuation range of +6 dB→−5 dB (1 dB step) with a fixed output swing at the end of the chain. The total area of the filter shown in FIG. 3, including the differential implementation with the ESDs, attenuators and in-between decoupling grid for isolation may be only 380 um×290 um. This is comparable to a well optimized single-channel slice of a time-interleaved RF sampling ADC, therefore integration-friendly. The area of the whole front-end including the gain buffer of FIG. 9 may be only 650 um×290 um. The achievable bandwidth can be more than 2× larger than other RF sampling ADC-based receiver front-ends while providing the possibility to have gain and attenuation in the chain as well as variability.

Features and Associated Technical Benefits

The integrated ultra-wide bandwidth (>30 GHz) multi-functionality front-end solution for RF sampling ADC-based receivers has many features and associated technical benefits.

Significantly enhanced input bandwidth by employing a multi-tap filter (e.g., $9^{th}$ order Chebyshev filter) and absorbing the ESD capacitance and the capacitance of various attenuator cells inside its taps. This can be generalized to inserting any circuit inside the filter and absorbing its capacitance.

By designing termination resistance $R_T$ to be smaller, e.g., 25Ω (50Ω differential), instead of the 50Ω (100Ω differential) used in other solutions, allows for more capacitance absorption for a fixed bandwidth or higher bandwidth for a certain capacitance due to the C values the filter takes by this adjustment.

The $R_T$ adjustment to 25Ω also reduces the L values in the filter by 2× for a certain bandwidth, which makes the solution very compact in area, requiring <90 pH inductors for >60 GHz filter bandwidth.

Splitting the ESD only in two segments provides superior reliability for the same bandwidth compared to other multi-segment splitting ESD solutions, due to the segments being able to handle more current.

The reliability is further enhanced by optimizing the ESD segments considering the filter $L_2$, such that the current paths between the first and second segments match.

Introduction in the filter of (without the loss of generality) four variable switched attenuator cells, whose capacitance can be also completely absorbed by simply subtracting it from the designed capacitance required by the filter. The attenuator cells are designed matched to the impedance of the chain.

Improved switched attenuator cells (Π-cell and T-cell) using bootstrapped switches instead of physical resistors, to work with deep-scaled CMOS technologies, such as 16 nm FinFET. Bootstrapping the gates of the switches improves linearity, and limits impact on the total linearity of the front-end.

Optimum arrangement of attenuations in ascending order from the input (largest swing) to the output (smallest swing) of the filter help achieve wide bandwidth and high linearity.

Optimum choice of attenuator cell type (between Π and T) for a certain attenuation value to yield maximum bandwidth and linearity benefits.

Flexibility and possibility to combine the filter with the distributed components with a gain or buffer stage of any kind, whose capacitance is also absorbed in the same way as the ESD and attenuators.

One possible combination of the filter with a hybrid fixed gain buffer stage to yield a complete variable gain/attenuation functionality with fixed and maximum bandwidth, linearity and noise for all states, since it is determined by the gain buffer.

Zero DC power consumption in the entire filter, since the filter comprises only passive structures and switches. The (only) power consumption is spent in the gain buffer stage (e.g., a stage with low power class-AB operation), which is also smaller compared to existing solutions by design.

Extremely compact in area comparable to an ADC slice, making it very attractive for deep-scaled CMOS integration.

Flexibility and possibility to be extended in more or less taps depending on the requirement of the specific design, without sacrificing any of the aforementioned advantages. More taps would require more inductors, but their value will be smaller for the same total bandwidth, therefore area can be preserved to a great extent.

Other Implementation Notes, Variations, and Applications

It is also imperative to note that various devices described herein have only been offered for purposes of example and teaching only. Such information may be varied considerably without departing from the spirit of the present disclosure. The various embodiments apply only to one non-limiting example and, accordingly, they should be construed as such. In the foregoing description, example embodiments have been described with reference to particular device arrangements. Various modifications and changes may be made to such embodiments without departing from the spirit of the present disclosure. The description and drawings are, accordingly, to be regarded in an illustrative rather than in a restrictive sense.

The front-end architectures describe herein are particularly suitable for high speed, and wide bandwidth applications where the performance is critical. Applications which can greatly benefit from the architecture include: instrumentation, testing, spectral analyzers, military purposes, radar, wired or wireless communications, mobile telephones (especially because standards continue to push for higher speed communications), and base stations. These products are employed in wired and wireless communications, instrumentation, radar, electronic warfare, and other applications.

Note that with the numerous examples provided herein, interaction may be described in terms of two, three, four, or more electrical devices or components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions herein illustrate only some of the possible functions that may be carried out by, implemented by, executed by, or within, the systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the disclosure encompass all such changes, substitutions, variations, alterations, and modifications as falling within the scope of the present disclosure. Note that all optional features of the apparatus described above may also be implemented with respect to the method or process described herein and specifics in the examples may be used anywhere in one or more embodiments.

What is claimed is:

1. A front-end at an input of a radio-frequency analog-to-digital converter of a receiver, the front-end comprising:
   a multi-tap filter comprising inductor-capacitor circuits;
   attenuator cells distributed across taps of the multi-tap filter;
   electrostatic discharge protection circuitry integrated with the multi-tap filter, wherein the electrostatic discharge protection circuitry comprises a first segment upstream of a first inductor of the multi-tap filter, and a second segment downstream of the first inductor; and
   a gain stage at an output of the multi-tap filter.

2. The front-end of claim 1, wherein the multi-tap filter includes five shunt capacitors and four inductors.

3. The front-end of claim 1, wherein the multi-tap filter implements a $9^{th}$ order symmetrical Chebyshev filter.

4. The front-end of claim 1, wherein one or more ones of the attenuator cells has programmable attenuation.

5. The front-end of claim 1, wherein one or more ones of the attenuator cells is switchable to be on or off.

6. The front-end of claim 1, wherein the attenuator cells comprises one attenuator cell having a Π-topology and three attenuator cells having a T-topology.

7. The front-end of claim 1, wherein each attenuator cell includes a series resistance and a shunt resistance.

8. The front-end of claim 1, wherein each attenuator cell includes a bypass switch to short input and output nodes of the attenuator cell.

9. The front-end of claim 1, wherein the front-end is on-chip with the radio-frequency analog-to-digital converter.

10. The front-end of claim 1, wherein the attenuator cells are tunable based on an automatic gain control signal.

11. The front-end of claim 1, wherein the gain stage provides a variable gain based on an automatic gain control signal.

12. A front-end at an input of a radio-frequency analog-to-digital converter of a receiver, the front-end comprising:
    a multi-tap filter comprising inductor-capacitor circuits;
    attenuator cells distributed across taps of the multi-tap filter, wherein the attenuator cells comprise a first attenuator cell, the first attenuator cell comprising:
       at least one transistor having a bootstrapped gate to provide a series resistance;
       a shunt path to provide a shunt resistance, the shunt path comprising a shunt transistor; and
       a bypass switch comprising a bypass transistor having a gate driven by a control signal, wherein the bypass transistor shorts an input node of the first attenuator cell and an output node of the first attenuator cell when the bypass transistor is on;
    electrostatic discharge protection circuitry integrated with the multi-tap filter; and
    a gain stage at an output of the multi-tap filter.

13. The front-end of claim 12, wherein the at least one transistor is biased to be constantly on during operation.

14. The front-end of claim 12, wherein the at least one transistor is bootstrapped to the input of the first attenuator cell.

15. The front-end of claim 12, wherein the bypass transistor is bootstrapped to an input of the first attenuator cell.

16. The front-end of claim 12, wherein the shunt transistor is bootstrapped to a drain of the shunt transistor.

17. The front-end of claim 12, wherein the electrostatic discharge protection circuitry comprises a first segment upstream of a first inductor of the multi-tap filter, and a second segment downstream of the first inductor.

18. A front-end at an input of a radio-frequency analog-to-digital converter of a receiver, the front-end comprising:
    a multi-tap filter comprising inductor-capacitor circuits;
    attenuator cells distributed across taps of the multi-tap filter;
    electrostatic discharge protection circuitry integrated with the multi-tap filter;
    a gain stage at an output of the multi-tap filter; and
    a termination resistor coupled to an input of the gain stage, wherein the front end is differential, and wherein the termination resistor has a resistance of less than 100Ω,
    wherein the front-end is on-chip with the radio-frequency analog-to-digital converter, and
    wherein the front-end has a bandwidth of greater than 30 gigahertz.

19. The front-end of claim 18, wherein the resistance of the termination resistor is 50 Ω.

20. The front-end of claim 18, further A front-end at an input of a radio-frequency analog-to-digital converter of a receiver, the front-end comprising:
- a multi-tap filter comprising inductor-capacitor circuits;
- attenuator cells distributed across taps of the multi-tap filter;
- electrostatic discharge protection circuitry integrated with the multi-tap filter;
- a gain stage at an output of the multi-tap filter; and
- a termination resistor coupled to an input of the gain stage, wherein the front end is single-ended, and wherein the termination resistor has a resistance of less than 50Ω,
- wherein the front-end is on-chip with the radio-frequency analog-to-digital converter, and
- wherein the front-end has a bandwidth of greater than 30 gigahertz.

21. The front-end of claim 20, wherein the resistance of the termination resistor is 25 Ω.

* * * * *

UNITED STATES PATENT AND TRADEMARK OFFICE
CERTIFICATE OF CORRECTION

PATENT NO. : 12,250,015 B2
APPLICATION NO. : 17/903970
DATED : March 11, 2025
INVENTOR(S) : Athanasios Ramkaj et al.

Page 1 of 1

It is certified that error appears in the above-identified patent and that said Letters Patent is hereby corrected as shown below:

In the Specification

In Column 2, Line 17, delete "inductive Tin-coils" and insert --inductive T/Π-coils--.

In Column 10, Claim 8, Line 10, delete "the attentuator cell." and insert --the attenuator cell.--.

In Column 10, Claim 19, Line 67, delete "resistor is 50 Ω." and insert --resistor is 50Ω.--.

In Column 11, Claim 20, Line 1, delete "The front-end of claim 18, further A front-end" and insert --A front-end--.

In the Claims

In Column 11, Claim 21, Line 19, delete "resistor is 25 Ω." and insert --resistor is 25Ω.--.

Signed and Sealed this
Thirteenth Day of May, 2025

Coke Morgan Stewart
*Acting Director of the United States Patent and Trademark Office*